United States Patent
Nishizawa et al.

(10) Patent No.: US 6,442,294 B1
(45) Date of Patent: Aug. 27, 2002

(54) DIGITAL IMAGE PROCESSING APPARATUS WITH INTERPOLATION AND ADDER CIRCUITS

(75) Inventors: Masato Nishizawa; Kenji Tabei, both of Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/683,130

(22) Filed: Jul. 18, 1996

Related U.S. Application Data (63) Continuation of application No. 08/288,868, filed on Aug. 11, 1994, now abandoned.

(30) Foreign Application Priority Data

Sep. 3, 1993 (JP) .............................................. 5-219601

(51) Int. Cl.⁷ ................................................ G06K 9/00
(52) U.S. Cl. ...................................... 382/168; 382/300
(58) Field of Search ........................ 382/160, 167–169, 382/300; 239/99; 378/51; 702/181

(56) References Cited

U.S. PATENT DOCUMENTS

| | | | | |
|---|---|---|---|---|
| 4,534,059 A | * | 8/1985 | Yamada ....................... | 382/274 |
| 4,965,679 A | * | 10/1990 | Morton et al. ............... | 358/462 |
| 5,063,607 A | * | 11/1991 | Fitz-Henry et al. .......... | 382/274 |
| 5,083,204 A | * | 1/1992 | Heard et al. ................. | 348/164 |
| 5,140,649 A | * | 8/1992 | Kaseyama ................... | 382/167 |
| 5,239,378 A | * | 8/1993 | Tsuji et al. .................. | 348/625 |
| 5,360,968 A | * | 11/1994 | Scott ........................... | 235/454 |
| 5,388,168 A | * | 2/1995 | Sakashita et al. ........... | 382/274 |

FOREIGN PATENT DOCUMENTS

| | | |
|---|---|---|
| EP | 0488542 A1 | 6/1992 |
| EP | 0516084 A2 | 12/1992 |
| EP | 0532295 A2 | 3/1993 |
| EP | 0548781 A2 | 6/1993 |
| JP | 61276071 A | 12/1986 |
| JP | 63167983 A | 7/1988 |
| JP | 3177981 A | 8/1991 |

OTHER PUBLICATIONS

German Official Action of Jun. 15, 1999 regarding Application P 44 30 629.6–53 in German and English.
Dr.–Ing. Rainer Portscht, "Interpolation bei tabellenbezogener Arithmetik für Standard–Mikrorechner," Elektronik, vol. 12, Jun. 1987, pp. 67–76.

* cited by examiner

Primary Examiner—Jayanti K. Patel
(74) Attorney, Agent, or Firm—Stevens, Davis, Miller & Mosher, LLP

(57) ABSTRACT

Input data is sampled discretely by a sampling circuit and a cumulative histogram of a plurality of bars is prepared by a cumulative histogram preparing circuit on the basis of the sampled input data. The cumulative histogram is latched by a latch circuit for three vertical scanning periods. Bar values of the cumulative histogram are used by an interpolation circuit to perform contrast conversion of the input data. A gamma circuit applies the gamma characteristic to the data subject to the contrast conversion. An output of the gamma circuit and the input data are inputted to an adder circuit so as to be added and averaged at a predetermined ratio.

17 Claims, 6 Drawing Sheets

| MSB3BITS | D7 | D6 | D5 | D4 | D3 | D2 | D1 | D0 |
|---|---|---|---|---|---|---|---|---|
| 000 | 1 | 1 | 1 | 1 | 1 | 1 | 1 | 1 |
| 001 | 1 | 1 | 1 | 1 | 1 | 1 | 1 | 0 |
| 010 | 1 | 1 | 1 | 1 | 1 | 1 | 0 | 0 |
| 011 | 1 | 1 | 1 | 1 | 1 | 0 | 0 | 0 |
| 100 | 1 | 1 | 1 | 1 | 0 | 0 | 0 | 0 |
| 101 | 1 | 1 | 1 | 0 | 0 | 0 | 0 | 0 |
| 110 | 1 | 1 | 0 | 0 | 0 | 0 | 0 | 0 |
| 111 | 1 | 0 | 0 | 0 | 0 | 0 | 0 | 0 |

1: COUNT UP    0: NO-COUNT

FIG. IIA

FIG. IIB

FIG. IIC

DIGITAL IMAGE PROCESSING APPARATUS WITH INTERPOLATION AND ADDER CIRCUITS

This application is continuation of application Ser. No. 08/288.868, filed Aug. 11, 1994 now abandoned.

BACKGROUND OF THE INVENTION

1. Field of the Invention

The present invention relates to a digital image processing apparatus which can improve gradation by converting the contrast of a video signal of a television camera or monitor.

2. DESCRIPTION OF THE RELATED ART

Figure 1A:
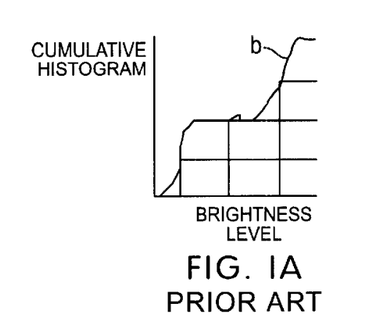
FIGS. 1A, 1B and 1C provide graphical representations for explaining the contrast conversion through a cumulative histogram according to the prior art.
Figure 1B:
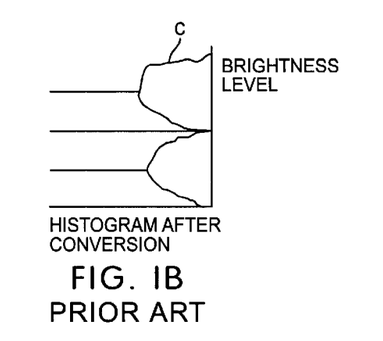
Figure 1C:
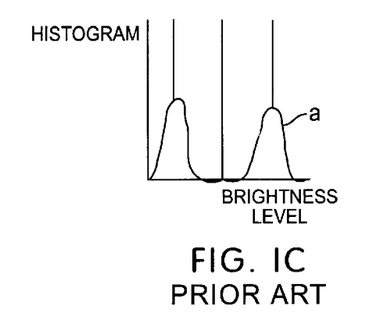

In an apparatus handling video signals such as a television camera or monitor, visuality of images is promoted by determining a histogram (contrast histogram) and performing contrast conversion (Image Processing Handbook, published by Shoko-do, pp. 263–266). For example, a method has been known which improves the gradation through contrast conversion using a cumulative histogram as shown in FIGS. 1A–1C. In FIG. 1C, curve a represents a histogram distribution of input image data. Curve b represents a cumulative histogram obtained by integrating the histogram of curve a in the direction of brightness level. Curve c represents a histogram after conversion obtained by performing contrast conversion of the input image data through the cumulative histogram. As shown at curve c, by performing the contrast conversion using the cumulative histogram, the histogram after conversion can be distributed uniformly even for an image in which the contrast difference is large. A digital image processing apparatus which is based on this method to improve the gradation is disclosed in, for example, JP-A-61-276071 (hereinafter referred to as prior art 1) and JP-A-63-167983 (hereinafter referred to as prior art 2).

Figure 2:
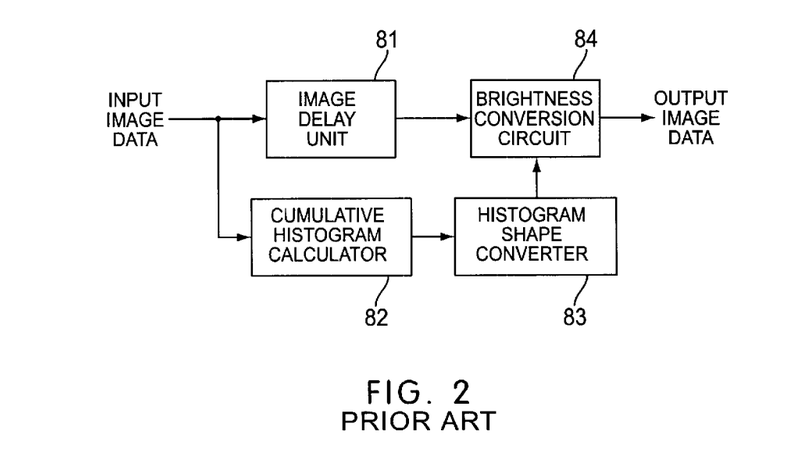
FIG. 2 is a block diagram of a prior art digital image processing apparatus.

As another prior art, FIG. 2 shows the construction of a digital image processing apparatus disclosed in JP-A-3-177981 (hereinafter referred to as prior art 3). In this apparatus, an image delay unit 81 delays input image data by one vertical scanning period. A cumulative histogram calculator 82 calculates a cumulative histogram of the input image data and applies calculation results to a histogram shape converter 83 constructed of a ROM or RAM. Output signals of the histogram shape converter 83 and image delay unit 81 are inputted to a brightness conversion circuit 84. Essentially, the operation of prior art 3 is similar to that of prior art 1 or 2. However, in prior art 3, the contrast conversion of the input image data is not carried out by using a cumulative histogram and the conversion characteristic is changed in the histogram shape converter 83. Namely, prior: art 3 is applied with a countermeasure against the case where contrast after conversion is excessively strong in prior art 1 or 2.

As described above, in any of prior arts 1 to 3, the contrast conversion is practiced by converting the input image data.

Figure 3:
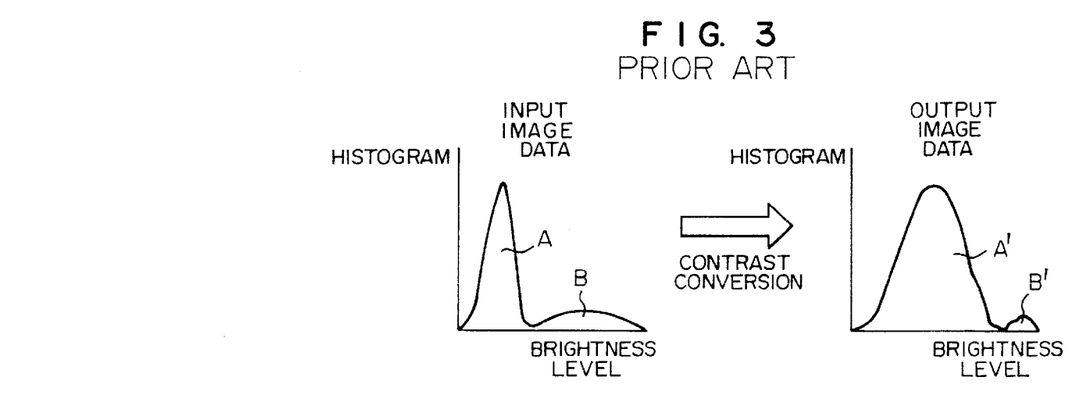
FIG. 3 is a graphical representation for explaining problems encountered in the prior art.

In the above prior arts 1 and 2, however, the contrast is compressed in the extreme at an image portion where the histogram frequency is small, raising a problem that the gradation becomes too small to be recognized easily. More particularly, as shown in FIG. 3, when a portion A of input image data where the histogram frequency is large and a portion B where the histogram frequency is small are subjected to contrast conversion with the digital image processing apparatus of prior art 1 or 2, corresponding portions of output image data become portions A' and B', respectively. As a result, at the output image data portion B' corresponding to the portion B where the histogram frequency of the input image data is small, the gradation is deteriorated considerably. In the above prior art 3, this problem can be solved by optimally setting the changed conversion characteristic stored in the ROM or RAM constituting the histogram shape converter 83. However, it is very difficult to optimize the changed conversion characteristic for various types of input image data.

Another problem encountered in the above prior arts 1 to 3 is that the circuit scale becomes large, leading to high costs. Further, in the aforementioned prior arts 1 to 3, output image data subject to contrast conversion is distributed uniformly, but does not have a gamma characteristic of an ordinary video signal which takes the gamma characteristic of the Braun tube into account, raising a problem that as viewed on the Braun tube, a bright portion assumes a large contrast and a dark portion is seen in depressed tone.

SUMMARY OF THE INVENTION

The present invention has been made to solve the above problems of the prior arts. An object of the present invention is to provide a digital image processing apparatus which can perform optimum contrast conversion even at an image portion where the histogram frequency is small.

Another object of the present invention is to provide an inexpensive digital image processing apparatus of small circuit scale.

Still another object of the present invention is to provide a digital image processing apparatus which can perform contrast conversion with taking the gamma characteristic of the Braun tube into account.

Still another object of the present invention is to provide a digital image processing apparatus which can reduce fluorescent lamp flicker of input data through contrast conversion.

To accomplish the above objects, a digital image processing apparatus according to the present invention comprises cumulative histogram preparing means for preparing a cumulative histogram from input data, interpolation means for performing contrast conversion of the input data by using the cumulative histogram prepared by the cumulative histogram preparing means, and adder means for adding and averaging an output signal of the interpolation means and the input data at a predetermined ratio.

The digital image processing apparatus according to the present invention further comprises sampling means for sampling the input data discretely and supplying the discretely sampled input data to the cumulative histogram preparing means.

The digital image processing apparatus according to the present invention further comprises gamma correction means interposed between the interpolation means and the adder means for applying gamma correction to the output signal of the interpolation means.

The digital image processing apparatus according to the present invention further comprises latch means interposed between the cumulative histogram preparing means and the interpolation means for holding the cumulative histogram prepared by the cumulative histogram preparing means for one or more vertical scanning periods.

The digital image processing apparatus according to the present invention further comprises image memory means for delaying the input data by one vertical scanning period and supplying the delayed input data to the interpolation means and the adder means.

According to the digital image processing apparatus according to the present invention constructed as above, good gradation can be maintained by adding and averaging an image portion, where the gradation is deteriorated through the contrast conversion and the histogram frequency is small, and the input data of the original image at a predetermined ratio.

Further, in the digital image processing apparatus according to the present invention, the use of the entirety of input data of the image is not required during preparation of the cumulative histogram, so that a circuit of small scale suffices to realize an inexpensive construction.

Further, in the digital image processing apparatus according to the present, invention, the processing for applying the gamma characteristic (gamma correction) is applied after the contrast conversion, so that a natural image display can be realized on the Braun tube.

Furthermore, in the digital image processing apparatus according to the present invention, by subjecting the input data to contrast conversion through the cumulative histogram for three vertical scanning periods by way of illustrative example by means of the latch means, reduction of the influence of fluorescent lamp flicker occurring every three vertical scanning periods can be realized.

DESCRIPTION OF THE PREFERRED EMBODIMENTS

Figure 4:
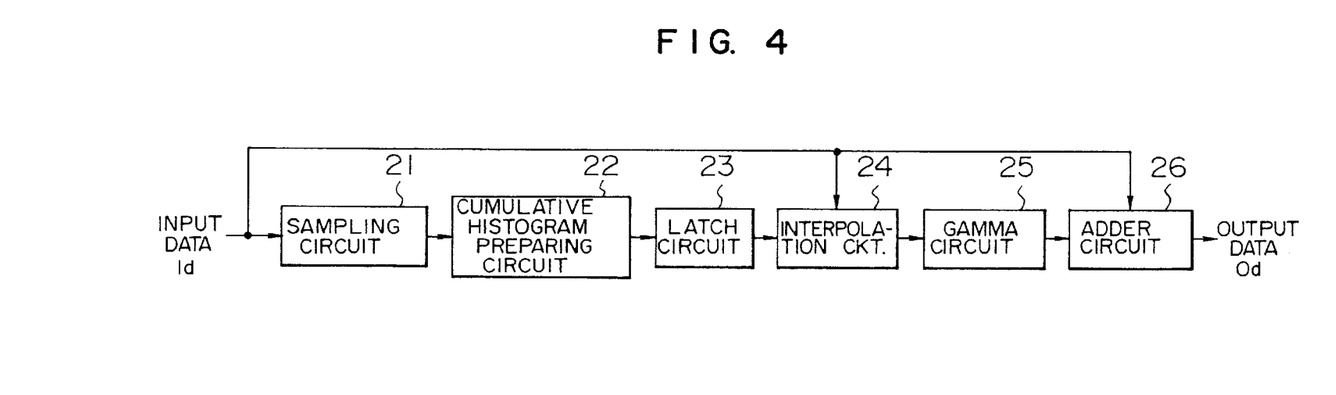
FIG. 4 is a block diagram showing the construction of a digital image processing apparatus according to a first embodiment of the present invention.
Figure 5:
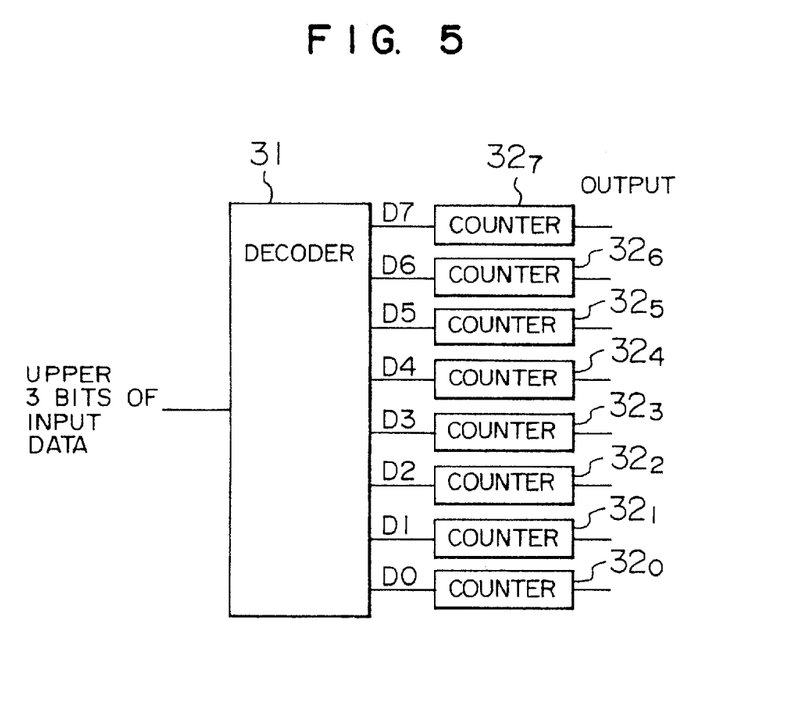
FIG. 5 is a block diagram showing the construction of a cumulative histogram preparing circuit shown in FIG. 4.

As shown in FIG. 4, a digital image processing apparatus according to a first embodiment of the present invention comprises a sampling circuit 21, a cumulative histogram preparing circuit 22, a latch circuit 23, an interpolation circuit 24, a gamma circuit 25, and an adder circuit 26. In the sampling circuit 21, input data Id is sampled discretely. The sampled input data is delivered from the sampling circuit: 21 to the cumulative histogram preparing circuit 22. In the cumulative histogram preparing circuit 22, accumulative histogram of the sampled input data is prepared. As shown in FIG. 5, the cumulative histogram preparing circuit 22 includes a decoder 31 to which upper three bits of the input data from the sampling circuit 21 are inputted, and eight counters $32_0$ to $32_7$ to which eight output signals $D_0$ to $D_7$ delivered out of the decoder 31 are inputted one by one. In the latch circuit 23, the cumulative histogram delivered out of the cumulative histogram preparing circuit 22 is latched for three vertical scanning periods. The latched cumulative histogram is delivered from the latch circuit 23 to the interpolation circuit 24. In the interpolation circuit 24, contrast conversion of the input data Id is carried out using the cumulative histogram delivered out of the latch circuit 23. The input data subject to the contrast conversion is delivered from the interpolation circuit 24 to the gamma circuit 25. In the gamma circuit 25, the input data subject to the contrast conversion undergoes a gamma characteristic processing. In the adder circuit 26, the input data subject to the gamma characteristic processing delivered out of the gamma circuit 25 is added to the input data Id. An output signal of the adder circuit 26 is delivered to the outside in the form of a contrast conversion finished output data Od.

The operation of the digital image processing apparatus will now be described. In the sampling circuit 21, the input data Id is sampled discretely at predetermined intervals. More specifically, the input data Id is two dimensional image data of, for example, 242 vertical pixels and 768 horizontal pixels and is sampled in the form of data of 6 bits at 1024 lattice points resulting from 32 divisions in vertical and horizontal directions. The cumulative histogram preparing circuit 22 prepares a cumulative histogram from data pieces at the 1024 points. The number of sampling points in the sampling circuit 21 may be other than 1024. However, if the number is excessively small, then a moving body in a picture, for example, will sometimes be sampled and will not sometimes be sampled and the histogram will change delicately. As a result, an image subject to contrast conversion suffers from flicker. Accordingly, the number of sampling points may preferably be 256 or more for usual natural pictures.

Figure 6:
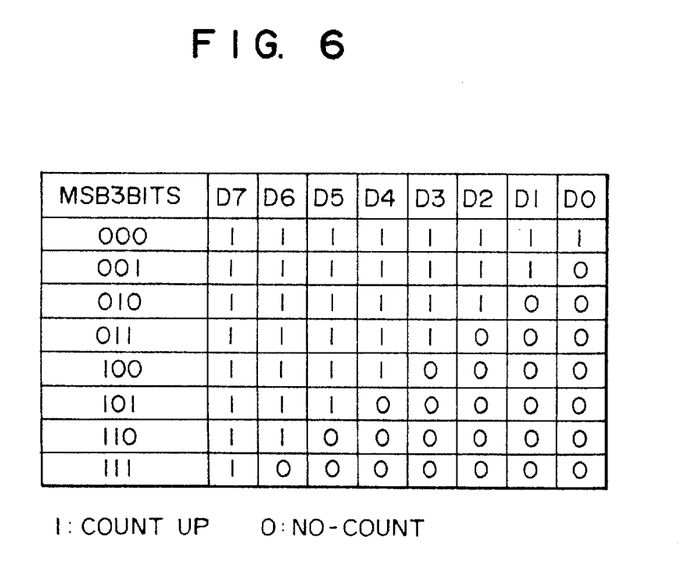
FIG. 6 is a diagram showing a decode characteristic of a decoder shown in FIG. 5.

The cumulative histogram preparing circuit 22 uses upper three bits of the input data sampled discretely, as shown in FIG. 5, to prepare eight bars of cumulative histogram. The decoder 31 is a logical circuit having a decode characteristic as shown in FIG. 6. Each of the counters $32_0$ to $32_7$ is a 10-bit counter and responds to output signals $D_0$ to $D_7$ of the decoder 31 to carry out counting. By repeating counting for one vertical scanning period, bar values of the cumulative histogram of two-dimensional image data are formed by the respective counters $32_0$ to $32_7$. Each of the thus obtained bar values of the cumulative histogram is held by the latch circuit 23 for three vertical scanning periods. The holding over three vertical scanning periods has relation to a countermeasure against fluorescent lamp flicker, on the ground that when the fluorescent lamp flickers at 100 Hz in the case of a monitor having a vertical scanning frequency of 60 Hz, a flicker component is of 20 Hz and the input data Id is correlated to the flicker component at intervals of three vertical scanning periods.

With the construction as above, the correlation between the input data Id and the cumulative histogram for conversion of the input data Id can be maintained.

The output signal of the latch circuit 23 is inputted to the interpolation circuit 24. The interpolation circuit 24 selects two bars of the cumulative histogram, i.e. a higher bar of the cumulative histogram and a bar of the cumulative histogram which is lower than the higher bar by one, from eight bars, of the cumulative histogram formed on the basis of upper three bits of the input data Id and performs contrast conversion by interpolating the values of the selected two bars of the cumulative histogram in accordance with lower three bits of the input data. For example, when upper three bits of the input data Id indicate "101", the output signal of the counter $325$ applied with the output signal $D_5$ of the decoder 31 is selected as a higher bar of the cumulative histogram and the output signal of the counter $32_4$ applied with the output signal $D_4$ of the decoder 31 is selected as a bar of the cumulative histogram which is lower than the higher bar by one (see FIGS. 5 and 6).

Figure 7:
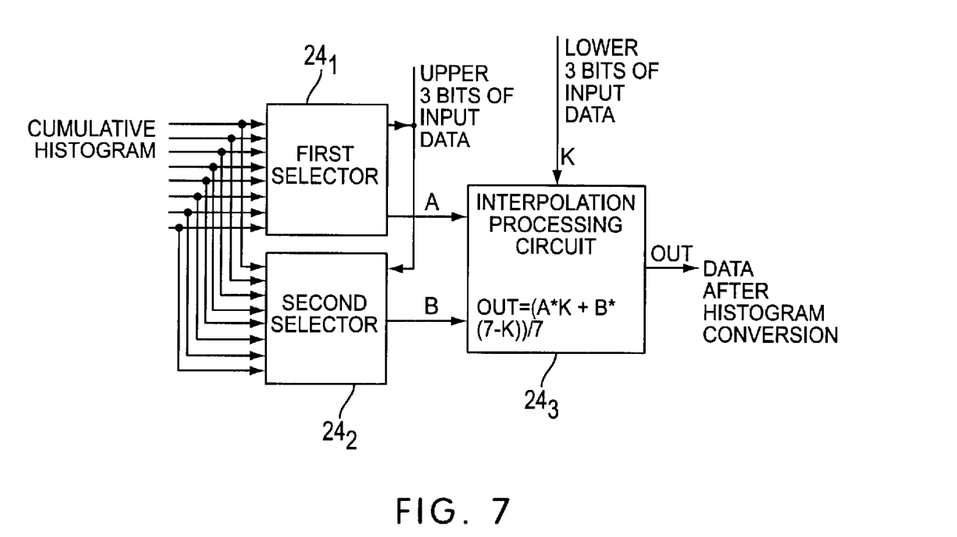
FIG. 7 is a block diagram showing the construction of an interpolation circuit shown in FIG. 4.

As shown in FIG. 7, the interpolation circuit 24 includes first and second selectors $24_1$ and $24_2$ to which eight bar values of the cumulative histogram and upper three bits of the input data Id are inputted, and an interpolation processing circuit $24_3$ to which an output signal (A) of the first selector $24_1$, an output signal (B) of the second selector $24_2$, and lower three bits (K) of the input data Id are inputted. In the first selector $24_1$, a cumulative histogram bar value to which the input data Id belongs is selected from eight cumulative histogram bar values in accordance with a value of upper three bits of the input data Id and delivered out of the interpolation processing circuit $24_3$ as the output signal (A). On the other hand, in the second selector $24_2$, a cumulative histogram bar value to which data obtained by subtracting "8" from the input data Id belongs is selected from the eight cumulative histogram bar values in accordance with the value of upper three bits of the input data Id and delivered to the interpolation. processing circuit $24_3$ as the output signal (B). In this procedure, when upper three bits of the input data Id are all "0", the value of data obtained by subtracting "8" from the input data Id is a minus value, indicating that a cumulative histogram bar value to which this data value belongs is not present, and therefore "0" is delivered to the interpolation processing circuit $24_3$ as the output signal (B). In the interpolation processing circuit $24_3$, linear interpolation using a value of lower three bits (K) of the input data Id is carried out in accordance with the following equation:

$$OUT=\{A*K+B*(7-K)\}/7.$$

Accordingly, the output signal (A) of the first selector $24_1$ is delivered out of the interpolation processing circuit $24_3$ when the value of lower three bits (K) of the input data Id is "111", the output signal (B) of the second selector $24_2$ is delivered out of the interpolation processing circuit $24_3$ when the value of lower three bits (K) of the input data Id is "000", and the output signal having a value between the output signal (A) of the first selector $24_1$ and the output signal (B) of the second selector $24_2$ is delivered out of the interpolation processing circuit $24_3$ when the value of lower three bits (K) of the input data Id lies between "111" and "000". The output signal (OUT) of the interpolation processing circuit $24_3$ indicates data after histogram conversion and serves as an output signal of the interpolation circuit 24.

The output signal of the interpolation circuit 24 is inputted to the gamma circuit 25. In the gamma circuit 25, inverse conversion of the gamma characteristic of the Braun tube is carried out in relation to the output signal of the interpolation circuit 24.

The output signal of the gamma circuit 25 is inputted, along with the input data Id, to the adder circuit 26. In the adder circuit 26, data subject to contrast conversion and the input data Id are added and averaged at a predetermined ratio to prepare an output data Od. For example, the two data:, are subjected to arithmetic average in the adder circuit 26.

Figure 8A:
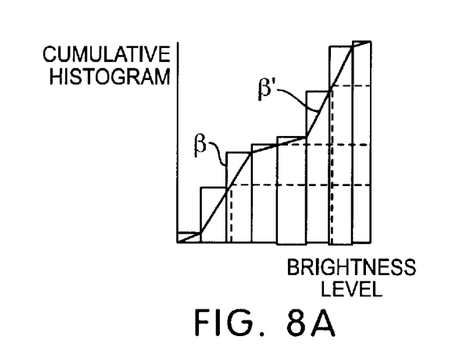
FIGS. 8A, 8B, and 8C provide graphical representations for explaining contrast conversion in the digital image processing apparatus shown in FIG. 4.
Figure 8B:
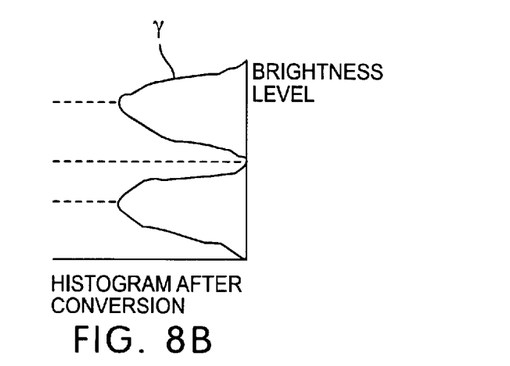
Figure 8C:
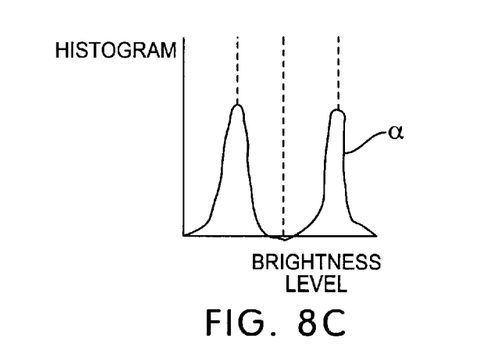

FIGS. 8A–8C are a diagram for explaining the contrast conversion in the digital image processing apparatus according to the present embodiment. In the Figure, curve α represents a histogram distribution of input image data, bar graph β represents a cumulative histogram obtained by integrating the histogram of curve α in the direction of brightness level as in the case of the prior art, line β' represents a conversion curve obtained by interpolating the cumulative histogram, and curve γ represents a histogram after conversion obtained by subjecting input image data to contrast conversion through the conversion curve (line β'). As will be seen from a comparison of curve γ with curve c shown in FIG. 1B, in the digital image processing apparatus according to the present embodiment, by performing contrast conversion by using the conversion curve as a result of the interpolation of the cumulative histogram, optimum contrast conversion can be effected even at an image portion where the histogram frequency is small.

As described above, according to the first embodiment of the present invention, input data of an image including portions which extremely differs in contrast from each other can be converted into data of optimum contrast. Since the input data Id is sampled discretely by the sampling circuit 21, the cumulative histogram preparing circuit 22 can be realized with a circuit of small scale to advantage. The latch circuit 23 latches the cumulative histogram for three vertical scanning periods and hence the influence of fluorescent lamp flicker can be decreased. The interpolation circuit 24 permits the histogram conversion from a plurality of cumulative histogram bars, thus realizing the histogram conversion with a simplified circuit. The gamma circuit 25 ensures the histogram conversion conformable with the gamma characteristic of the Braun tube. Since the adder circuit 26 performs the addition and average of contrast conversion finished data and original input data Id, gradation can advantageously be maintained at a portion where the histogram frequency is decreased through the contrast conversion.

Figure 9:
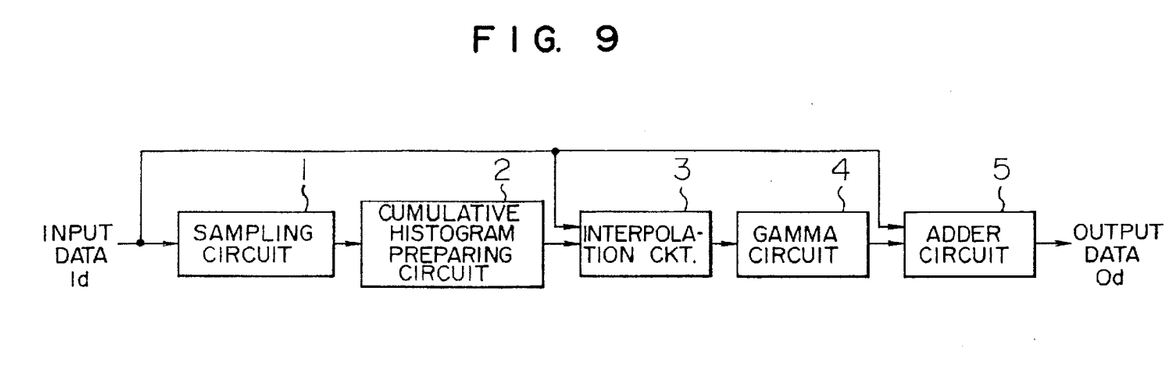
FIG. 9 is a block diagram showing the construction of a digital image processing apparatus according to a second embodiment of the present invention.

A digital image processing apparatus according to a second embodiment of the present invention is used under the use condition that the influence of fluorescent lamp flicker is not present and as shown in FIG. 9, it differs from the FIG. 4 digital image processing apparatus according to the first embodiment of the present invention in that the latch circuit 23 shown in FIG. 4 is not provided. Namely, when the vertical scanning frequency of a video signal equals the frequency of the power supply, the influence of fluorescent lamp flicker does not occur and the latch circuit 23 shown in FIG. 4 can therefore be dispensed with. The operation of the digital image processing apparatus according to the second embodiment of the present invention is similar to that of the FIG. 4 digital image processing apparatus according to the first embodiment of the present invention with the exception that the cumulative histogram delivered out of the cumulative histogram preparing circuit 2 is inputted to the interpolation circuit 3 without being held by the latch circuit for three vertical scanning periods and will not be described herein. Except that the effect of decreasing the influence of fluorescent lamp flicker is not achievable, the digital image processing apparatus according to the second embodiment of the present invention can attain similar effects to those by the first embodiment of the present invention shown in FIG. 4.

Figure 10:
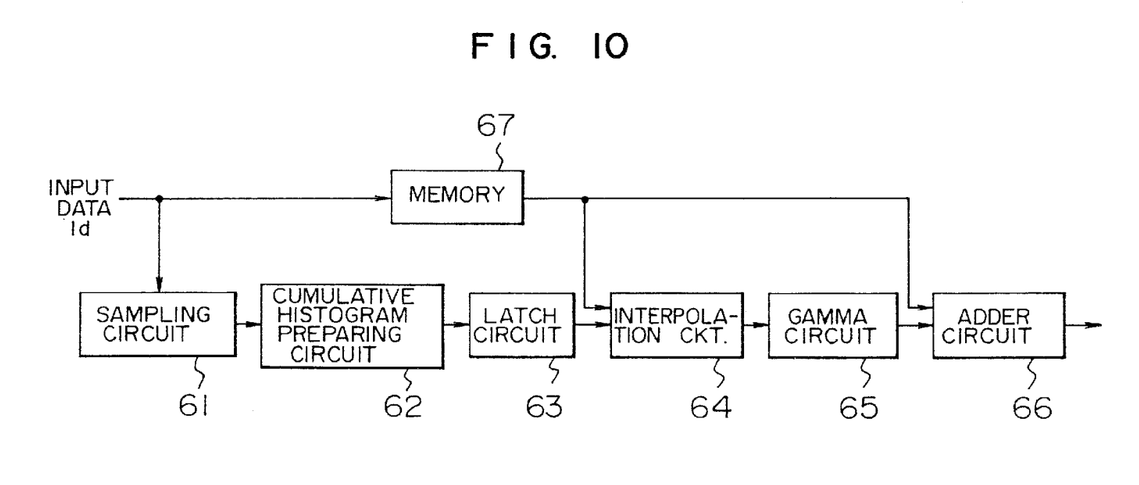
FIG. 10 is a block diagram showing the construction of a digital image processing apparatus according to a third embodiment of the present invention.

A digital image processing apparatus according to a third embodiment of the present invention differs as shown in FIG. 10 from the FIG. 4 digital image processing apparatus according to the first embodiment of the present invention in that input data Id is inputted to an interpolation circuit 64 and an adder circuit 66 after being delayed by one vertical scanning period by means of a memory 67 and the output signal of a cumulative histogram preparing circuit 62 is held for one vertical scanning period by means of a latch circuit 63.

Figure 11A:
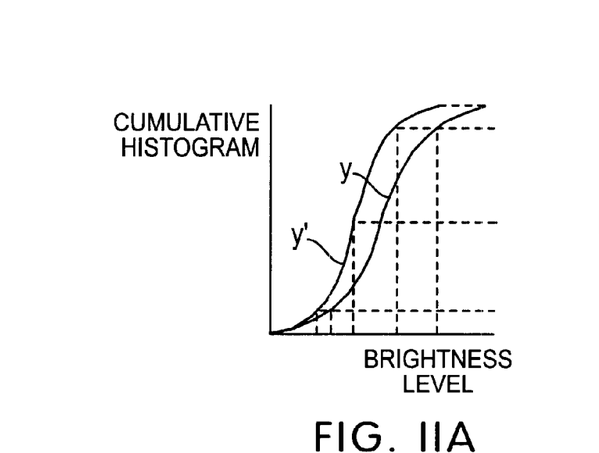
FIGS. 11A, 11B and 11C provide graphical representations for explaining nonoccurrence of a flicker component in the digital image processing apparatus shown in FIG. 10.
Figure 11B:
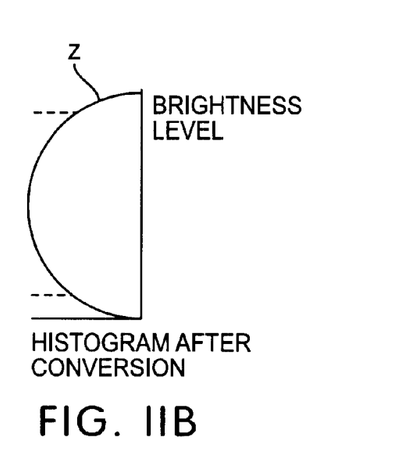
Figure 11C:
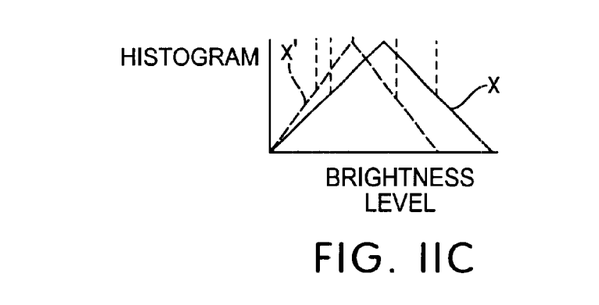

When the brightness of illumination is changed and the brightness of the entire image is changed uniformly, flicker is caused. For example, when the brightness of illumination is 0.75 times changed, the brightness of the entire image is 0.75 times changed. Therefore, if the histogram distribution of input image data is indicated by solid curve x in FIG. 11C when the brightness of illumination is "1", the histogram distribution of input image data is indicated by dotted curve x' in FIG. 11C when the brightness of illumination is "0.75" times changed. When cumulative histograms are prepared in this case by using input image data, a cumulative histogram as shown at solid curve y in FIG. 11A is obtained for the input image data shown at solid curve x in the Figures. On the other hand, a cumulative histogram as shown at curve y' in FIG. 11A is obtained for the input image data shown at dotted curve x' in the Figure. Accordingly, by performing contrast conversion through the use of these cumulative histograms, a histogram after conversion can be obtained which is constant regardless of the change in the brightness of illumination as shown at curve z in FIG. 11B. Thus, in the histogram after conversion, no flicker component takes place.

As described above, so long as input image data used for preparation of a cumulative histogram is subjected to contrast conversion by using the prepared cumulative histogram, the influence of flicker does not occur in a histogram after conversion. Then, in the digital image processing apparatus, according to the present embodiment, one vertical scanning period taken for the cumulative histogram preparing circuit 62 and latch circuit 63 to prepare the cumulative histogram is needed and therefore, the input data Id is inputted to the interpolation circuit 64 after being delayed by one vertical scanning period by means of the memory 67 as shown in FIG. 10. In this manner, the interpolation circuit 64 performs contrast conversion of the input data Id used for preparation of the cumulative histogram by using the prepared cumulative histogram. Accordingly, even in the digital image processing apparatus according to the present embodiment, the fluorescent lamp flicker can be removed and besides similar effects to those by the FIG. 4 digital image processing apparatus according to the first embodiment can be attained.

It will be appreciated that under the use condition that the influence of fluorescent lamp flicker need not be taken into account, the latch circuit 23 may be constructed as a latch circuit for one vertical scanning period in the first embodiment. While in the first and third embodiments the cumulative histogram is prepared by using the input data occurring during one vertical scanning period, a cumulative histogram can be prepared from input data occurring during two vertical scanning periods or a plurality of vertical scanning periods.

As described above, in the digital image processing apparatus according to the present invention, the data as a result of contrast conversion of a cumulative histogram and input data are added and averaged in the adder circuit, so that good gradation can advantageously be maintained at an image portion where the histogram frequency is small.

Further, according to the present invention, a cumulative histogram is prepared by using input data sampled discretely by means of the sampling circuit and hence the circuit can be reduced in scale and can be realized at low costs.

Furthermore, according to the present invention, the gamma characteristic processing is applied to data after contrast conversion and hence natural gradation can be obtained on the Braun tube to advantage.

In addition, according to the present invention, since a cumulative histogram used for conversion is prepared by using the same input data as that to be converted or input data occurring three vertical scanning periods earlier, the influence of fluorescent lamp flicker can advantageously be reduced.

What is claimed is:

1. A digital image processing apparatus comprising:
   cumulative histogram preparing means for receiving input data and preparing a cumulative histogram from input data;
   interpolation means for performing contrast conversion of the input data by using the cumulative histogram prepared by said cumulative histogram preparing means to produce contrast converted data; and
   adder means for receiving (a) the contrast converted data from said interpolation means and (b) the input data and for adding and averaging the received contrast converted data and the received input data at a predetermined ratio.

2. A digital image processing apparatus according to claim 1 further comprising sampling means for sampling the input data discretely and supplying the discretely sampled input data to said cumulative histogram preparing means.

3. A digital image processing apparatus according to claim 1 further comprising gamma correction means interposed between said interpolation means and said adder means for applying gamma correction to the contrast converted data.

4. A digital image processing apparatus according to claim 3 further comprising sampling means for sampling the input data discretely to produce discretely sampled input data and supplying the discretely sampled input data to said cumulative histogram preparing means.

5. A digital image processing apparatus according to claim 1 further comprising latch means interposed between said cumulative histogram preparing means and said interpolation means for holding the cumulative histogram prepared by said cumulative histogram preparing means for one or more vertical scanning periods.

6. A digital image processing apparatus according to claim 5 further comprising sampling means for sampling the input data discretely and supplying the discretely sampled input data to said cumulative histogram preparing means.

7. A digital image processing apparatus according to claim 6 further comprising gamma correction means interposed between said interpolation means and said adder means for applying gamma correction to the contrast converted data.

8. A digital image processing apparatus according to claim 5 further comprising gamma correction means interposed between said interpolation means and said adder means for applying gamma correction to the contrast converted data.

9. A digital image processing apparatus according to claim 1 further comprising image memory means for delaying the input data by one vertical scanning period to produce delayed input data and supplying the delayed input data to said interpolation means and said adder means.

10. A digital image processing apparatus according to claim 9 further comprising sampling means for sampling the input data discretely to produce discretely sampled input data and supplying the discretely sampled input data to said cumulative histogram preparing means.

11. A digital image-processing apparatus according to claim 10 further comprising gamma correction means interposed between said interpolation means and said adder means for applying gamma correction to the contrast converted data.

12. A digital image processing apparatus according to claim 9 further comprising gamma correction means interposed between said interpolation means and said adder means for applying gamma correction to the contrast converted data.

13. A digital image processing apparatus according to claim 9 further comprising latch means interposed between said cumulative histogram preparing means and said interpolation means for holding the cumulative histogram preparing means for one vertical scanning period.

14. A digital image processing apparatus according to claim 13 further comprising sampling means for sampling the input data discretely to produce discretely sampled input data and supplying the discretely sampled input data to said cumulative histogram preparing means.

15. A digital image processing apparatus according to claim 14 further comprising gamma correction means interposed between said interpolation means and said adder means for applying gamma correction to the contrast converted data.

16. A digital image processing apparatus according to claim 13 further comprising gamma correction means interposed between said interpolation means and said adder means for applying gamma correction to the contrast converted data.

17. A digital image processing apparatus according to claim 1, wherein said adder means comprises means for performing an arithmetic average of the contrast converted data and the input data.

* * * * *